(12) United States Patent
Bailey

(10) Patent No.: US 7,461,877 B2
(45) Date of Patent: Dec. 9, 2008

(54) BUMPER PROTECTION SYSTEM

(76) Inventor: Pauline Elizabeth Bailey, P.O. Box 171, Queens Village, NY (US) 11428-0171

( * ) Notice: Subject to any disclaimer, the term of this patent is extended or adjusted under 35 U.S.C. 154(b) by 297 days.

(21) Appl. No.: 11/400,946

(22) Filed: Apr. 10, 2006

(65) Prior Publication Data
US 2007/0236024 A1 Oct. 11, 2007

(51) Int. Cl.
*B60R 19/44* (2006.01)
(52) U.S. Cl. .................................................. 293/142
(58) Field of Classification Search ............... 293/102, 293/107, 108, 118, 126, 142; 296/187.09, 296/187.03
See application file for complete search history.

(56) References Cited

U.S. PATENT DOCUMENTS

| | | | | |
|---|---|---|---|---|
| 3,822,076 A | * | 7/1974 | Mercier et al. | 293/107 |
| 4,810,015 A | | 3/1989 | McNeil | |
| 4,815,777 A | * | 3/1989 | Campbell | 293/107 |
| 5,106,137 A | * | 4/1992 | Curtis | 293/107 |
| 5,215,031 A | * | 6/1993 | Inman et al. | 114/360 |
| 5,725,265 A | * | 3/1998 | Baber | 293/107 |
| 5,810,427 A | * | 9/1998 | Hartmann et al. | 296/187.03 |
| 6,056,336 A | * | 5/2000 | Balgobin | 293/107 |
| 6,106,038 A | * | 8/2000 | Dreher | 293/118 |
| 6,126,214 A | * | 10/2000 | Kim | 293/107 |
| 6,443,510 B2 | * | 9/2002 | Gibeau et al. | 293/107 |
| 6,497,183 B2 | * | 12/2002 | Demarquilly et al. | 105/392.5 |
| 6,749,218 B2 | * | 6/2004 | Breed | 280/735 |
| 6,923,483 B2 | * | 8/2005 | Curry et al. | 293/107 |
| 7,036,844 B2 | * | 5/2006 | Hammer et al. | 280/730.1 |
| 2001/0028173 A1 | * | 10/2001 | Demarquilly et al. | 293/107 |
| 2003/0020289 A1 | * | 1/2003 | Dohrmann et al. | 293/107 |
| 2005/0035608 A1 | * | 2/2005 | Larsen et al. | 293/107 |

\* cited by examiner

*Primary Examiner*—H Gutman
(74) *Attorney, Agent, or Firm*—Raymond M. Galasso; David O. Simmons; Galasso & Associates, LP.

(57) ABSTRACT

A vehicle bumper protection system comprises a control unit, a pneumatically inflatable protective cover and an air pump. The control unit is configured for selectively outputting an inflation signal and a deflation signal. The pneumatically inflatable protective cover is configured for being attached to a bumper of a vehicle and is normally in a deflated condition. The air pump is electrically connected to the control unit and is fluid communicatively connected to the protective cover. The air pump supplies compressed air to the protective cover for inflating the protective cover when the inflation signal is outputted by the control unit. The air pump facilitates deflation of the protective cover when the deflation signal is outputted by the control unit.

15 Claims, 2 Drawing Sheets

BUMPER PROTECTION SYSTEM

FIELD OF THE DISCLOSURE

The disclosures made herein relate generally to protective implements for automobile body panels and bumpers and, more particularly, to selectively controllable protective implements for automobile body panels and bumpers.

BACKGROUND

Vehicles such as cars and light trucks are particularly susceptible to damage sustain from contact with objects while parked or while being parked. Examples of such objects include, but are not limited to, other vehicles, shopping karts, trees, light posts, walls and concrete footings. Such damage is undesirable to a vehicle owner as it can reduce the value of a vehicle, cost considerable money to repair, compromise safety of the vehicle and/or detract from the aesthetic appeal of the vehicle.

It is well known that damage to bumpers of a vehicle often occurs when the vehicle is parked or is being parked. This is particularly true in the case of painted plastic bumpers that are susceptible to having the paint scuffed, chipped or otherwise damaged. In some instances, damage may occur to the bumper of a parked vehicle when another vehicle inadvertently contacts the bumper of the parked vehicle. In other instances, damage is done to the bumper of a vehicle being parked when it inadvertently contacts an object such as, for example, another vehicle, a shopping kart, a tree or plant, a light post, a wall and a concrete footing. While the damage done to a bumper during a single incident, repeated incidents of damage have a cumulative effect that, as a whole, can reduce the value of a vehicle, cost considerable money to repair, compromise safety of the vehicle and/or detract from the aesthetic appeal of the vehicle.

Therefore, a system for protecting a bumper of a vehicle from damage due to contact with objects while the vehicle is parked or being parked and that does so in a manner that overcomes limitations associated with conventional systems for protecting a bumper of a vehicle would be advantageous, desirable and useful.

SUMMARY OF THE DISCLOSURE

Embodiments of the present invention relate to protecting a vehicle bumper from incidental and accidental damage. More specifically, embodiments of the present invention provide for protecting a bumper of a vehicle from damage due to contact with objects while the vehicle is parked or being parked. Such functionality is beneficial and desirous because damage to one or more bumpers of a vehicle can reduce the value of a vehicle, cost considerable money to repair, compromise safety of the vehicle and/or detract from the aesthetic appeal of the vehicle.

In one embodiment of the present invention, a vehicle bumper protection system comprises a control unit, an expandable protective cover and an expansion apparatus. The control unit is configured for selectively outputting a first control signal and a second control signal. The expandable protective cover is configured for being attached to a bumper of a vehicle and is normally in a non-expanded condition. The expansion apparatus is connected to the control unit and to the protective cover. The expansion apparatus acts on the protective cover for causing the protective cover to expand to an expanded condition when the first control signal is outputted by the control unit. The expansion apparatus causes the protective cover to return to the non-expanded condition when the deflation signal is outputted by the control unit.

In another embodiment of the present invention, a vehicle bumper protection system comprises a control unit, a pneumatically inflatable protective cover and an air pump. The control unit is configured for selectively outputting an inflation signal and a deflation signal. The pneumatically inflatable protective cover is configured for being attached to a bumper of a vehicle and is normally in a deflated condition. The air pump is electrically connected to the control unit and is fluid communicatively connected to the protective cover. The air pump supplies compressed air to the protective cover for inflating the protective cover when the inflation signal is outputted by the control unit. The air pump facilitates deflation of the protective cover when the deflation signal is outputted by the control unit.

In another embodiment of the present invention, a vehicle comprises a front bumper, a rear bumper, a first pneumatically inflatable protective cover, a second pneumatically inflatable protective cover, a control unit, a first air pump and a second air pump. The first pneumatically inflatable protective cover is attached to the front bumper. The first protective cover is normally in a respective deflated condition. A second pneumatically inflatable protective cover is attached to the rear bumper. The second protective cover is normally in a respective deflated condition. The control unit is manually controllable for selectively outputting an inflation signal and a deflation signal. The first air pump is electrically connected to the control unit and is fluid communicatively connected to the first protective cover (e.g., via a hose or tube). The first air pump supplies compressed air to the first protective cover for inflating the first protective cover when the inflation signal is outputted by the control unit. The first air pump facilitates deflation of the first protective cover when the deflation signal is outputted by the control unit. The second air pump is electrically connected to the control unit and is fluid communicatively connected to the second protective cover. The second air pump supplies compressed air to the second protective cover for inflating the second protective cover when the inflation signal is outputted by the control unit. The second air pump facilitates deflation of the second protective cover when the deflation signal is outputted by the control unit.

Turning now to specific aspects of the present invention, in at least one embodiment, an air valve is provided for enabling the compressed air to be released from the interior space of the protective cover when the second control signal is outputted by the control unit.

In at least one embodiment of the present invention, the air valve is integral with the air pump.

In at least one embodiment of the present invention, the inflation signal includes is an electrical current supplied to the air pump and the deflation signal is an electrical current supplied to the air valve.

In at least one embodiment of the present invention, a bumper engagement surface of the protective cover is contoured to mate substantially flush with a mating portion of a bumper to which the protective cover is attached.

In at least one embodiment of the present invention, the protective cover includes a license plate exposure feature and edges of the license plate exposure feature at least partially encompass a license plate mounting region of the bumper for enabling visibility of the license plate mounting region of the bumper when the protective cover is attached to the bumper.

In at least one embodiment of the present invention, the expansion apparatus includes an air pump for supplying compressed air to an interior space of the protective cover and the compressed air is supplied to the interior space when the first control signal is outputted by the control unit.

In at least one embodiment of the present invention, the expansion apparatus includes an air valve for enabling the compressed air to be released from the interior space of the protective cover and the compressed air is released from the interior space when the second control signal is outputted by the control unit.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
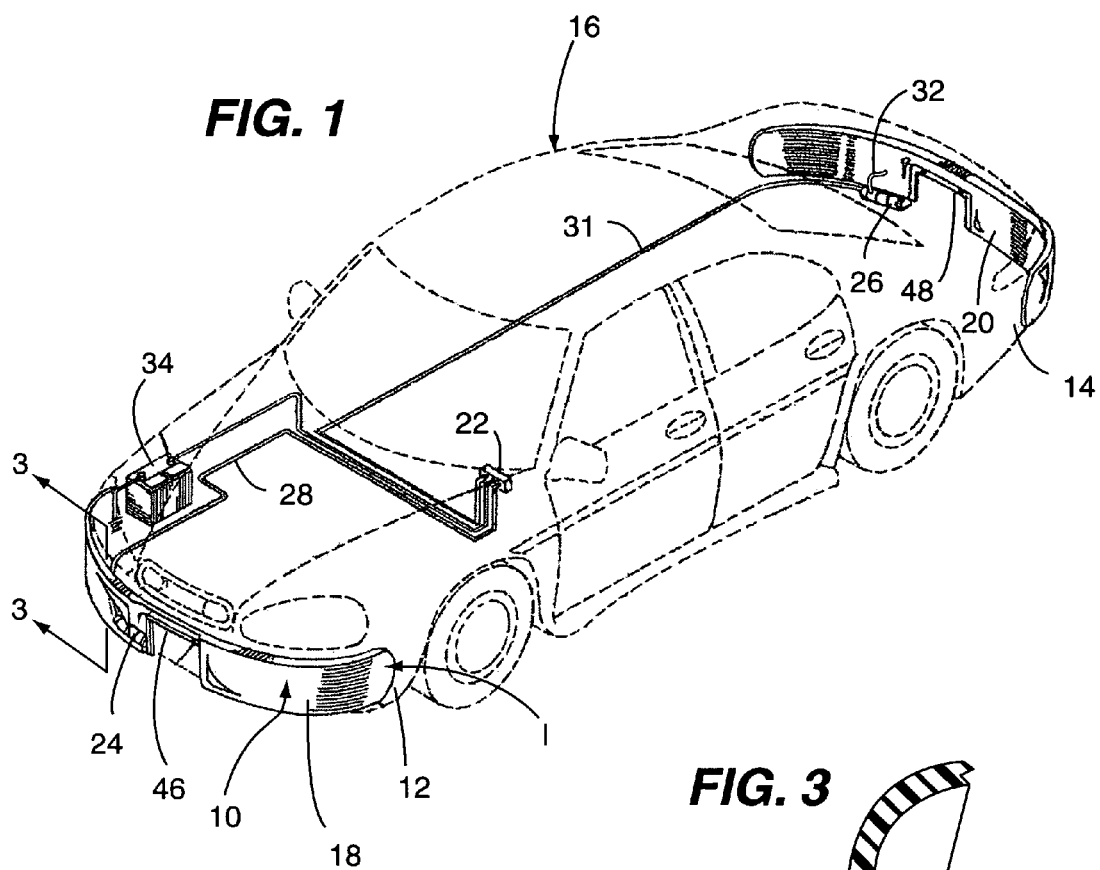
FIG. 1 is a perspective view showing an embodiment of a bumper protection system in accordance with the present invention.
Figure 3:
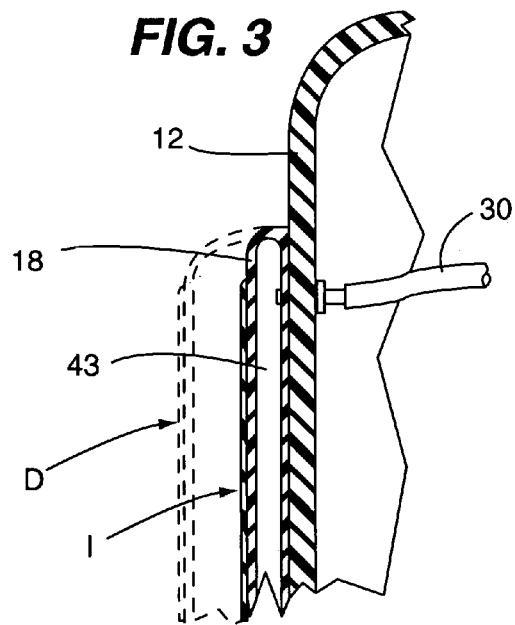
FIG. 3 is a cross sectional view taken along the line 3-3 in FIG. 1.
Figure 2:
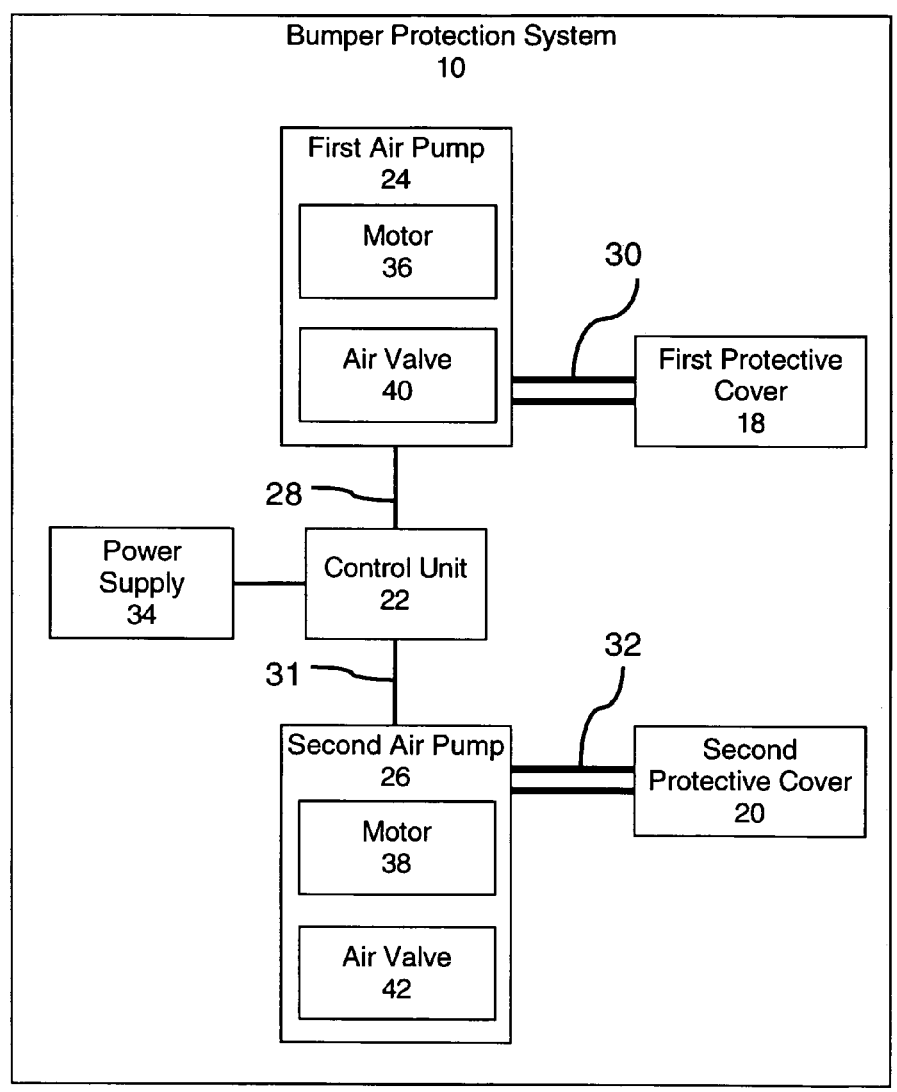
FIG. 2 is a block diagram of the bumper protection system of FIG. 1.

FIGS. 1-3 show various aspects of a bumper protection system in accordance with the present invention, which is referred to herein as the bumper protection system 10. The bumper protection system 10 serves to protect a front bumper 12 (i.e., a front bumper portion) and a rear bumper 14 (i.e., a rear bumper portion) of a vehicle 16. The bumper protection system 10 is selectively operable such that it can be user activated while the vehicle 16 is being parked and/or while it is parked and then deactivated while driving the car. While activated, the bumper protection system 10 provides a substantial degree of protection against damage to the front bumper 12 and the rear bumper 14 of the vehicle 16 from incidental and accidental contact with an object such as, for example, another vehicle, a shopping kart, a tree or plant, a light post, a wall and a concrete footing.

Referring now to FIGS. 1-3, the bumper protection system 10 includes a first pneumatically inflatable protective cover (i.e., the first protective cover 18), a second pneumatically inflatable protective cover (i.e., the second protective cover 20), a control unit 22, a first air pump 24 and a second air pump 26. The first protective cover 18 is attached to the front bumper 12 of the vehicle 16 and the second protective cover 20 is attached to the rear bumper 14 of the vehicle 16. It is disclosed herein that the protective covers (18, 20), may be attached via mechanical and/or adhesive means. Additionally, it is disclosed herein that the protective covers (18, 20) may be integrally formed with the bumpers (12, 14).

The first air pump 24 is electrically connected to the control unit 22 via one or more electrical conductors 28 and is connected to the first protective cover 18 via an air hose 30. The second air pump 26 is electrically connected to the control unit 22 via one or more electrical conductors 31 and is connected to the second protective cover 20 via an air hose 32. In this manner, the air pumps (24, 26) are connected to the respective one of the protective covers (18, 20) in a fluid communicatively manner such that compressed air from the air pumps (18,20) can be supplied to the respective one of the protective covers (18, 20). To components being fluid communicatively connected to each other refers to being connected in a manner that allows a fluid (e.g., compressed air) to be supplied from one component to another component in a generally contained manner (i.e., little to no leakage of the fluid).

The control unit 22 is controllable for selectively outputting an inflation signal and a deflation signal, such as via a switch having a first position corresponding to the inflation signal and a second position corresponding to the deflation signal. In one specific embodiment, the inflation signal is an electrical current that is supplied from a power supply 34 (e.g., a chassis grounded battery of the vehicle 16) through the control unit 22 to a respective motor portion (36, 38) of each one of the air pumps (18, 20) and the deflation signal is an electrical current that is provided through the control unit 22 to a respective air valve (40, 42) of each one of the air pumps (24, 26). Each air valve (40, 42) may be integral with the respective one of the air pumps (24, 26) or discretely connected thereto. It is disclosed herein that the control unit 22 may be manually controllable for selectively outputting an inflation signal and a deflation signal or may be controlled by a powertrain computer of the vehicle 16 (e.g., inflation signal provided when the vehicle is in parked and deflation signal provided when the vehicle is in gear).

The electrical current supplied to the respective drive portion (36, 38) of the air pumps drives the respective motor portion (36, 38) of the air pumps (24, 26), which in turn causes compressed air to be supplied to an interior space (e.g., the interior space 44 shown in FIG. 3) of the respective one of the protective covers (18,20) such that the protective covers (18, 20) inflate. The electrical current supplied to the respective air valve (36, 38) of the air pumps (24, 26) moves the respective air valve of the air pumps (24, 26) from a pressure holding position to a pressure release position such that the compressed air within the interior space of the protective covers (18, 20) escapes to the atmosphere, which in turn causes the protective covers (18,20) to deflate.

The protective covers (18, 20) are normally in a respective deflated condition D (FIG. 3) and achieve an inflated condition I (FIGS. 1 and 3) when compressed air is supplied from the air pumps (24, 26). When in the inflated condition I, the protective covers (18, 20) provide a cushion that limits damage to the bumpers (12, 14) when there is contact with another object. When in the deflated condition D, the protective covers (18, 20) are generally flush with the respective bumper (12, 14), thus lessening their aesthetic impact and/or enhancing their aesthetic appeal.

Optionally, to facilitate deflation of the protective covers (18,20), the air pumps (24,26) may be operated for creating a vacuum, thereby generating a suction force for evacuating air from within the interior space of each protective cover (18, 20). Such a vacuum may be generated by applying a reverse polarity voltage to the motor portion (36, 38) of each one of the air pumps (24, 26) relative to the voltage polarity applied for generating compressed air. In such an optional embodiment, the air valves (40, 42) may be omitted, providing that some other means is provided for maintaining suitable air pressure within the interior space of the protective covers (18, 20) when the air pumps (24, 26) are not running.

Discussed above is a means for pneumatically inflating and deflating the protective covers (18, 20). However, it is disclosed herein that a non-pneumatic means may be used for expanding a protective bumper cover in accordance with the present invention. For example, a motor may be used for mechanically causing the protective bumper cover to change from a non-expanded condition to an expanded condition.

It is contemplated herein that a protective bumper cover in accordance with the present invention can be made from a number of different materials and/or in a number of different configurations. An important aspect of these materials and/or configurations is that a bumper cover in accordance with the present invention must be capable of being pneumatically or mechanically expanded to provide a cushioning effect on the case of accidental or incidental contact between a vehicle equipped with the bumper cover and another object. Preferably, but not necessarily, a protective bumper cover in accordance with the present invention is made from a durable polymeric material that is either resiliently inflatable or formed with pleats and/or bellows that facilitate expansion.

Referring now to FIGS. 1 and 3, a respective bumper engagement surface of each one of the protective covers (18, 20) is contoured to mate substantially flush with a mating portion of the respective bumper (12, 14). This is beneficial as it enhances the aesthetic appeal of the protective bumper covers (18, 20), maintains a relatively low profile for the protective bumper covers (18, 20) and/or distributes applied loads over a relatively large area of the bumpers (12, 14). Furthermore, as shown in FIG. 1, the protective bumper covers (18, 20) each include a respective license plate exposure recess (46, 48) having edges that at least partially encompass a license plate mounting region of the respective bumper (12, 14). The license plate exposure recesses (46, 48) enabling visibility of the license plate mounting region of the respective bumper (12, 14) when the respective protective bumper cover (18, 20) is attached to the respective bumper (12, 14). A license plate exposure recess is one embodiment of a license plate exposure feature in accordance with the present invention. A hole within a protective bumper cover (e.g., in the general shape of a license plate) is another embodiment of a license plate exposure feature in accordance with the present invention.

The protective covers (18, 20) are shown as covering a significant surface area of the respective bumper (12, 14) when in a deflated condition. Optionally, it is disclosed herein that the protective covers (18, 20) may be configured for deploying from a generally unseen position and covering substantially an entire face or surface of the bumpers (12, 14) when the protective covers (18, 20) are fully expanded. The present invention is not limited to a particular non-expanded shape or configuration, a particular non-expanded positioning and/or a particular degree of expansion.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle bumper protection system comprising:
a control unit configured for selectively outputting a first control signal and a second control signal;
an expandable protective cover configured for being attached to a bumper of a vehicle, wherein said protective cover is normally in a non-expanded condition; and
wherein a bumper engagement surface of said protective cover is contoured to mate substantially flush with a mating portion of the bumper; said protective cover includes a license plate exposure feature; and edges of the license plate exposure feature at least partially encompass a license plate mounting region of the bumper for enabling visibility of the license plate mounting region of the bumper when said protective cover is attached to the bumper; and
an expansion apparatus connected to the control unit and to said protective cover, wherein the expansion apparatus acts on said protective cover for causing said protective cover to expand to an expanded condition when the first control signal is outputted by the control unit and when the expansion apparatus causes said protective cover to return to the non-expanded condition when the second control signal is outputted by the control unit.

2. The system of claim 1 wherein:
the expansion apparatus includes an air pump for supplying compressed air to an interior space of said protective cover; and
said compressed air is supplied to the interior space when the first control signal is outputted by the control unit.

3. The system of claim 2 wherein:
the expansion apparatus includes an air valve for enabling said compressed air to be released from the interior space of said protective cover; and
said compressed air is released from the interior space when the second control signal is outputted by the control unit.

4. The system of claim 3 wherein the air valve is integral with the air pump.

5. The system of claim 1 wherein:
the expansion apparatus includes an air pump for supplying compressed air to an interior space of said protective cover;
said compressed air is supplied to the interior space when the first control signal is outputted by the control unit;
the expansion apparatus includes an air valve for enabling said compressed air to be released from the interior space of said protective cover; and
said compressed air is released from the interior space when the second control signal is outputted by the control unit.

6. A vehicle bumper protection system, comprising:
a control unit configured for selectively outputting an inflation signal and a deflation signal;
a pneumatically inflatable protective cover configured for being attached to a bumper of a vehicle, wherein said protective cover is normally in a deflated condition;
a bumper engagement surface of said protective cover is contoured to mate substantially flush with a mating portion of the bumper; said protective cover includes a license plate exposure feature; and edges of the license plate exposure feature at least partially encompass a license plate mounting region of the bumper for enabling visibility of the license plate mounting region of the bumper when said protective cover is attached to the license bumper;
an air pump electrically connected to the control unit and fluid communicatively connected to said protective cover, wherein the air pump supplies compressed air to said protective cover for inflating said protective cover when the inflation signal is outputted by the control unit and wherein the air pump facilitates deflation of said protective cover when the deflation signal is outputted by the control unit; and an air valve for enabling said compressed air to be released from the interior space of said protective cover when the second control signal is outputted by the control unit, wherein the air valve is integral with the air pump, wherein the inflation signal is an electrical current supplied to the air pump and wherein the deflation signal is an electrical current supplied to the air valve.

7. The system of claim 6, further comprising:

an air valve for enabling said compressed air to be released from the interior space of said protective cover when the second control signal is outputted by the control unit.

8. The system of claim 7 wherein the air valve is integral with the air pump.

9. The system of claim 7 wherein:

the inflation signal is an electrical current supplied to the air pump; and the deflation signal is an electrical current supplied to the air valve.

10. A vehicle, comprising:

a front bumper, a rear bumper, a first pneumatically inflatable protective cover attached to the front bumper, wherein said first protective cover is normally in a respective deflated condition;

a second pneumatically inflatable protective cover attached to the rear bumper, wherein said second protective cover is normally in a respective deflated condition;

a control unit manually controllable for selectively outputting an inflation signal and a deflation signal;

a first air pump electrically connected to the control unit and fluid communicatively connected to said first protective cover, wherein the first air pump supplies compressed air to said first protective cover for inflating said first protective cover when the inflation signal is outputted by the control unit and wherein the first air pump facilitates deflation of said first protective cover when the deflation signal is outputted by the control unit; and a second air pump electrically connected to the control unit and fluid communicatively connected to said second protective cover, wherein the second air pump supplies compressed air to said second protective cover for inflating said second protective cover when the inflation signal is outputted by the control unit and wherein the second air pump facilitates deflation of said second protective cover when the deflation signal is outputted by the control unit.

11. The system of claim 10, further comprising:

a first air valve connected to said first protective cover for enabling said compressed air to be released from an interior space of aid first protective cover when the second control signal is outputted by the control unit; and a second air valve connected to said second protective cover for enabling said compressed air to be released from an interior space of said second protective cover when the second control signal is outputted by the control unit.

12. The system of claim 10 wherein:

the first air valve is integral with the first air pump; and the second air valve is integral with the second air pump.

13. The system of claim 10 wherein:

a bumper engagement surface of said first protective cover is contoured to mate substantially flush with a mating portion of the first bumper; and a bumper engagement surface of said second protective cover is contoured to mate substantially flush with a mating portion of the second bumper.

14. The system of claim 13 wherein:

said first protective cover includes a license plate exposure feature;

edges of the license plate exposure feature of said first protective cover at least partially encompass a license plate mounting region of the first bumper for enabling visibility of the license plate mounting region of the first bumper when said first protective cover is attached to the first bumper;

said second protective cover includes a license plate exposure feature; and edges of the license plate exposure feature of said second protective cover at least partially encompass a license plate mounting region of the second bumper for enabling visibility of the license plate mounting region of the second bumper when the second protective cover is attached to the second bumper.

15. The system of claim 14, further comprising:

a first air valve connected to said first protective cover for enabling said compressed air to be released from an interior space of said first protective cover when the second control signal is outputted by the control unit; and a second air valve connected to said second protective cover for enabling said compressed air to be released from an interior space of said second protective cover when the second control signal is outputted by the control unit.

* * * * *